Patented Nov. 21, 1939

2,181,097

UNITED STATES PATENT OFFICE 2,181,097

FURNACE

Harold J. Ness, Bloomfield, N. J., assignor to Nesaloy Products, Inc., New York, N. Y., a corporation of New Jersey No Drawing. Application November 27, 1936, Serial No. 112,988. Renewed October 20, 1939

19 Claims. (Cl. 75—95)

This invention applies to metallurgical furnaces and more particularly to a method of producing and maintaining in such furnaces, an atmosphere exhibiting a strong lithium spectrum.

In a copending application Ser. No. 67,547, filed March 6, 1936, I have disclosed a number of ways of introducing lithium into a furnace to produce therein an atmosphere containing lithium, in which various metal heating operations may be conducted. Such ways include the introduction of metallic lithium into the air or fuel line of the burner, the vaporization of lithium into the furnace and the spraying of molten lithium into the furnace. In a subsequent application Ser. No. 79,968, filed May 15, 1936, I have disclosed a method of producing a furnace atmosphere exhibiting a lithium spectrum by introducing a compound of lithium, such as lithium chloride, lithium fluoride or lithium carbonate, into the air or fuel line of the furnace.

The present invention relates to still another method of producing, in a furnace, an atmosphere which will exhibit a lithium spectrum and be of use in the practice of various heating processes, one of the objects of the invention being to provide an improved method of using the compounds of lithium to produce a lithiated atmosphere in a furnace.

Another object is to effect an economy in the use of lithium in the carrying out of heating operations in the presence of or by the use of lithium or one of its compounds.

Still another object is to provide an improved method of treating the linings of furnaces for producing or assisting in the production and maintenance of a lithiated atmosphere in the furnace.

A still further object is to provide a method of reclaiming or restoring to a useful condition the linings of furnaces which have become contaminated by oxides, and other impurities.

Other objects and advantages will hereinafter appear.

It has been proposed heretofore to treat certain metals, such as copper, with lithium by introducing the lithium metal directly into the molten charge, but due to the highly volatile nature of lithium, it is quickly vaporized from the charge and either passes off or is consumed by the furnace lining. As a consequence, such processes have not been satisfactory, due to the uncertainty thereof and the lack of uniformity of the treated metals, and such processes have gone into disuse. In accordance with my aforesaid applications, these difficulties are avoided by producing within the furnace an atmosphere which exhibits a strong lithium line in the spectrum, maintaining such atmosphere throughout the process, and providing a lining material which is resistant to the disintegrating effect of the lithium containing atmosphere. By maintaining such an atmosphere lithium will be absorbed into the molten mass.

As set forth in the aforesaid applications, such atmosphere may be produced and maintained by employing a furnace lining which is capable of absorbing large quantities of lithium and of liberating the same slowly during the treating process. A furnace lining composed largely of silicon oxide has been found to be suitable. In accordance with my aforesaid applications, it has been thought necessary either to condition the lining before use by heating the lining in the presence of lithium vapor, preferably at a high temperature of about 2000° F. until it has absorbed a substantial amount of the lithium, after which the furnace could be used for a number of successive heats without reconditioning, and/or to introduce lithium metal or a compound of lithium into the furnace, either continuously or at intervals throughout the process. It is not necessary to add any lithium to the charge when the proper lithiated atmosphere is maintained, a sufficient amount thereof to accomplish the desired effect being absorbed into the mass from the lithium liberated by the heated furnace lining or from that introduced into the furnace during the process.

In accordance with my present discovery I find it is not necessary to condition the lining by vaporizing lithium metal or a compound of lithium in contact with the lining but that a thorough conditioning of the lining can be effected merely by painting, spraying or otherwise applying directly to the furnace walls, while the furnace is cold, a solution or a suspension of one of the lithium compounds, such as the chloride, fluoride or carbonate of lithium in a volatile solvent or a suspending medium, such as water. Due to the porosity of the walls of the furnace, a large amount of the solution or suspension of the lithium compound is absorbed into the lining and upon bringing the furnace up to heat, lithium or the lithium compound is given off slowly over a long period. Linings so treated may be operated for many hours at the usual copper treating temperatures of 2000° F. or higher while continuously maintaining a strong lithium line in the spectrum of the furnace gases. The lining may be composed largely of silicon oxide although other suitable refractory materials may be used.

Any of the metal heating or treating processes set forth in my aforesaid applications may be carried out in the furnace such as the production of copper-lead alloys, the manufacture of oxygen free copper, the making of lithiated steel or steel alloys, brazing or welding of steel to steel or to non-ferrous metals such as aluminum or the heating of solid metals, where it is desired to prevent oxidation, such as in hardening, normalizing and annealing of brass, copper and steel and the heating of steel for forging, pressing or piercing, etc.

It is to be understood, of course, that linings which have been conditioned by the application of a solution or suspension of a lithium compound thereto may be used for extended periods if additional lithium or lithium compound is supplied to the furnace from time to time, as by addition to the molten charge or by introduction into the air or fuel line, and the present invention contemplates the production of a lithiated atmosphere in a furnace either by treating the linings with the solution or suspension of a lithium compound alone or such treatment together with the addition of either lithium or one of its compounds to the furnace either continuously or from time to time during the use of the furnace.

It has been found that the present process may be applied equally well to new furnace linings or to linings which have been contaminated with oxides and other impurities by continued use. Used linings upon being heated following an application thereto of a lithium compound in solution or suspension, are rendered clean and capable of long continued use, and the process may, therefore, be used for reclaiming and reconditioning linings of furnaces for use in various metallurgical operations.

Obviously, other dissolving or suspending mediums may be employed for the lithium compounds depending upon the particular compound used and other considerations and other refractory bodies than furnace linings may be cleaned or provided with a store of lithium compound and I do not desire to be limited to the specific embodiments described herein but desire to include all applications of the invention which properly come within the scope of the appended claims.

What I claim is:

1. The method of conditioning a furnace in which a lithium containing atmosphere is to be produced which comprises applying to the linings of such furnaces a compound of lithium in a liquid dissolving or suspending medium.

2. The method of conditioning a furnace in which a lithium containing atmosphere is to be produced which comprises applying to the linings of such furnaces lithium chloride in a liquid dissolving or suspending medium.

3. The method of conditioning a furnace in which a lithium containing atmosphere is to be produced which comprises applying to the linings of such furnace lithium carbonate in a liquid dissolving or suspending medium.

4. The method of conditioning a furnace in which a lithium containing atmosphere is to be produced which comprises applying to the linings of such furnace a compound of lithium in a volatile liquid medium.

5. The method of producing a lithium containing atmosphere in a furnace which comprises applying to a refractory body in the furnace a suspension or solution of a lithium compound and heating said body during operation of the furnace, to a sufficient temperature to produce a lithium spectrum line in the furnace atmosphere.

6. The method of producing a lithium containing atmosphere in a furnace which comprises applying to the lining of the furnace a suspension or solution of a lithium compound and heating said lining during operation of the furnace, to a sufficient temperature to produce a lithium spectrum line in the furnace atmosphere.

7. The method of producing a lithium containing atmosphere in a furnace which comprises providing a lining for the furnace containing a substantial proportion of silica, applying to the lining of the furnace a suspension or solution of a lithium compound and heating said lining during operation of the furnace, to a sufficient temperature to produce a lithium spectrum line in the furnace atmosphere.

8. The method of cleansing the lining of a furnace from impurities comprising applying to the lining a solution or suspension of a lithium compound and heating the lining to a sufficient temperature to effect a reaction between the lithium compound and the impurities in the lining.

9. The method of conditioning a furnace which comprises applying a compound of lithium to the lining of the furnace to cause an absorption of the compound into said lining.

10. The method of conditioning a furnace for use in the heating of metals which comprises impregnating the lining with a compound of lithium.

11. A furnace having a lining composed largely of silicon oxide impregnated with a lithium compound.

12. A furnace having a porous refractory lining impregnated with a lithium compound.

13. A furnace having a porous refractory lining impregnated with lithium chloride.

14. A furnace having a porous refractory lining impregnated with lithium carbonate.

15. A furnace having a porous refractory body therein permeated with a lithium compound, such as the chloride, fluoride or carbonate of lithium.

16. A lining material for a furnace comprising a refractory material permeated with a compound of lithium.

17. A method of treating refractories for use in furnaces comprising subjecting said refractory to the action of a compound of lithium to cause absorption of said compound by the refractory.

18. A method of treating refractories for use in a furnace comprising subjecting said refractory to a spray of a compound of lithium to cause a union of said compound and said refractory.

19. The method of producing a lithium containing atmosphere in a furnace which comprises applying to the lining of the furnace a compound of lithium to effect a union thereof with said lining and heating said lining to a sufficient temperature to liberate lithium therefrom.

HAROLD J. NESS.